(12) United States Patent
Buerli

(10) Patent No.: US 6,392,746 B1
(45) Date of Patent: May 21, 2002

(54) ELECTRONIC FIBEROPTIC POWER AND WAVELENGTH MEASURING INSTRUMENT

(75) Inventor: Richard Buerli, Thousand Oaks, CA (US)

(73) Assignee: Rifocs Corporation, Camarillo, CA (US)

( * ) Notice: Subject to any disclaimer, the term of this patent is extended or adjusted under 35 U.S.C. 154(b) by 0 days.

(21) Appl. No.: 09/383,609

(22) Filed: Aug. 26, 1999

(51) Int. Cl.[7] ............................................... G01N 21/00
(52) U.S. Cl. .................. 356/73.1; 250/227.14
(58) Field of Search .................. 356/213, 218, 356/222, 221, 73.1, 73; 250/227.24, 227.14, 239, 216, 228; 385/88, 89, 134

(56) References Cited

U.S. PATENT DOCUMENTS

| | | | | |
|---|---|---|---|---|
| 4,822,997 A | * | 4/1989 | Fuller et al. ................ | 250/227 |
| 5,153,667 A | * | 10/1992 | Aoshima et al. ............ | 356/218 |
| 5,196,899 A | | 3/1993 | Serwatka .................... | 356/73.1 |
| 5,521,701 A | | 5/1996 | Felger et al. ............... | 356/218 |

* cited by examiner

*Primary Examiner*—Frank G. Font
*Assistant Examiner*—Tu T. Nguyen
(74) *Attorney, Agent, or Firm*—Jack C. Munro

(57) ABSTRACT

An electronic fiberoptic power measuring instrument which utilizes a plurality of different detectors to ascertain the power of a light beam. The light beam that enters the instrument can be selectively altered to be directly transmitted to a primary detector or can be reflected to be transmitted to a secondary detector. The structure for altering the light beam takes the form of a movable member which is arranged to intersect the path of the light beam. The movable member can be moved to a plurality of different positions with a different meter function being obtained at each position.

8 Claims, 6 Drawing Sheets

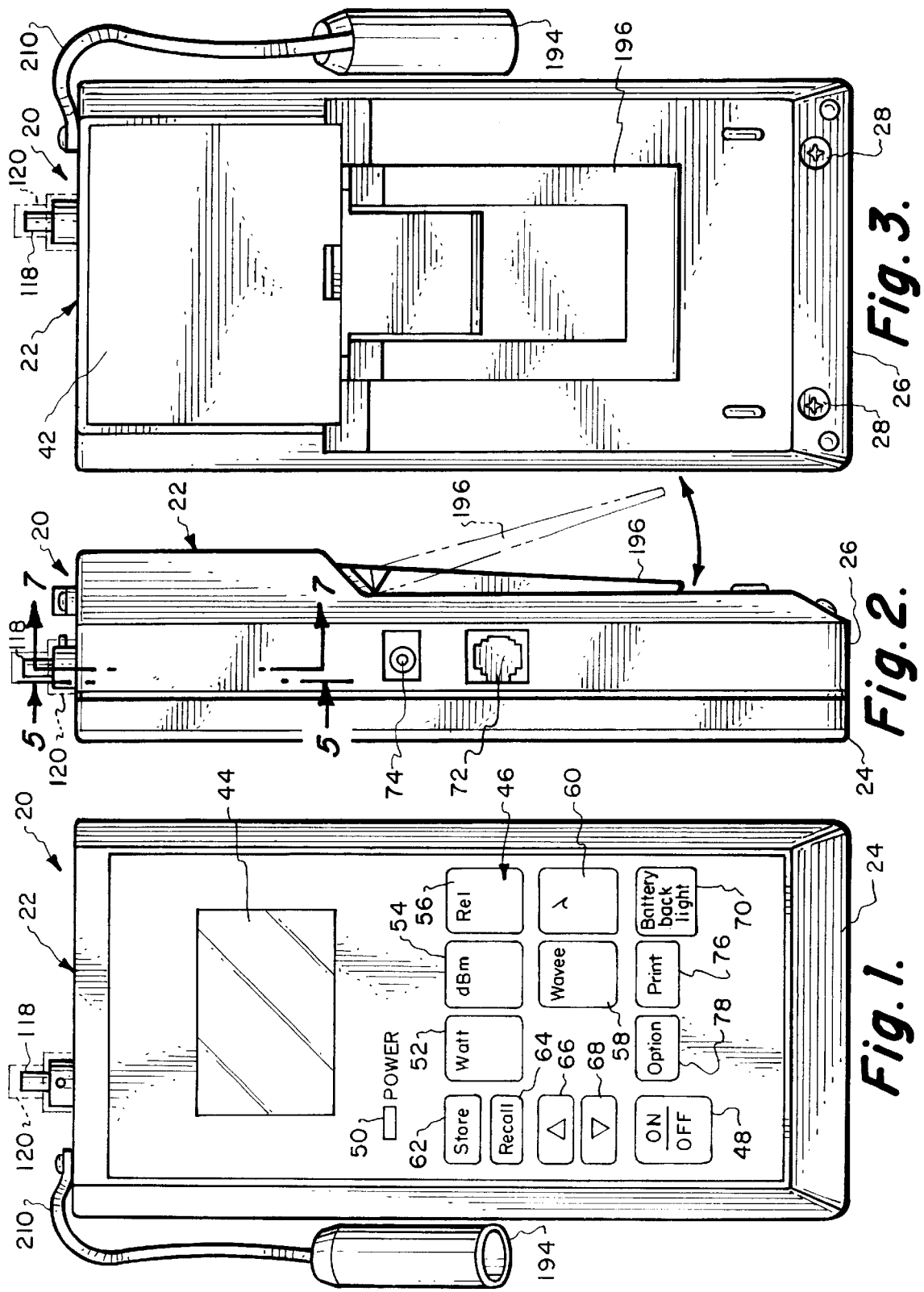

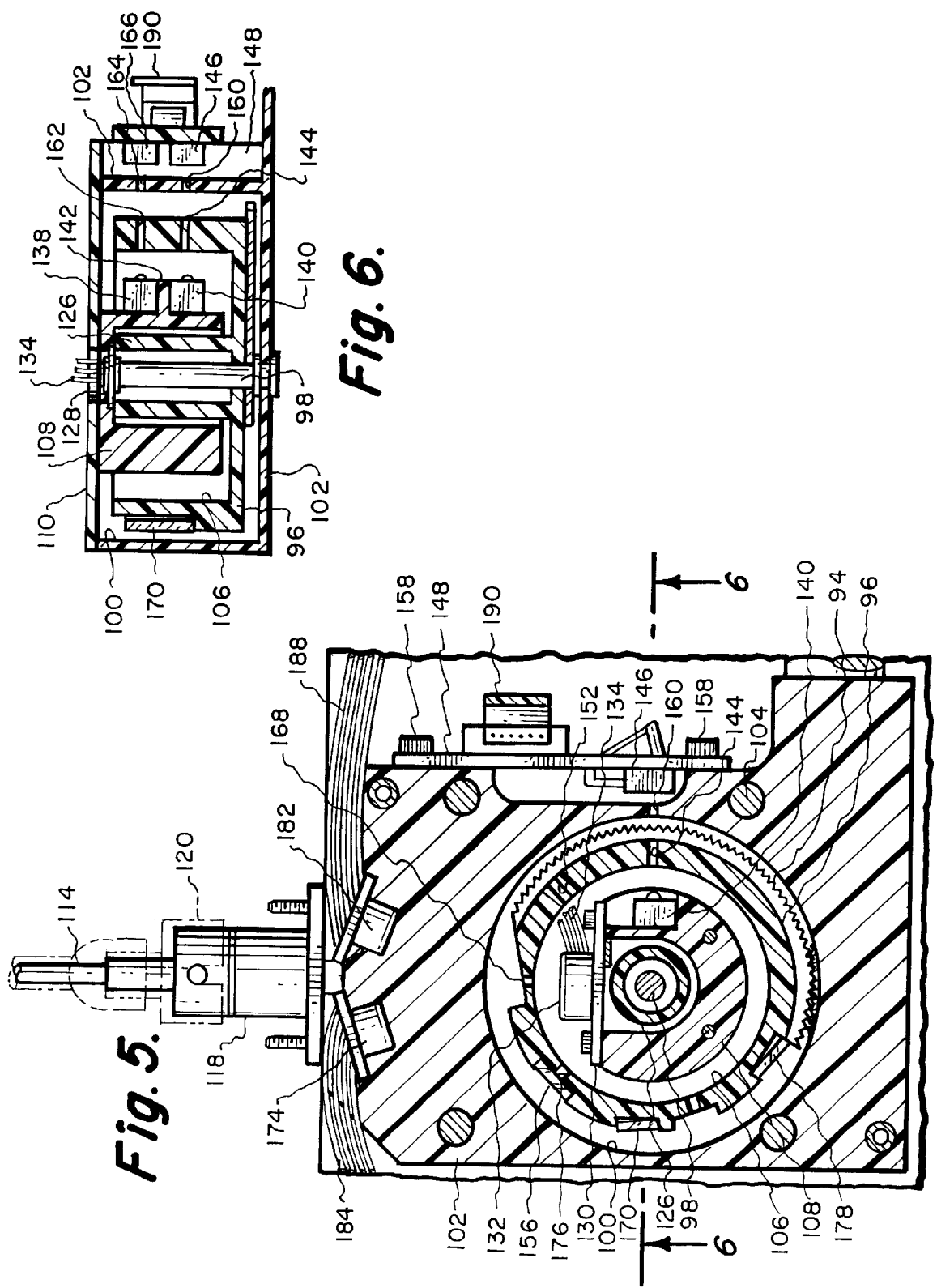

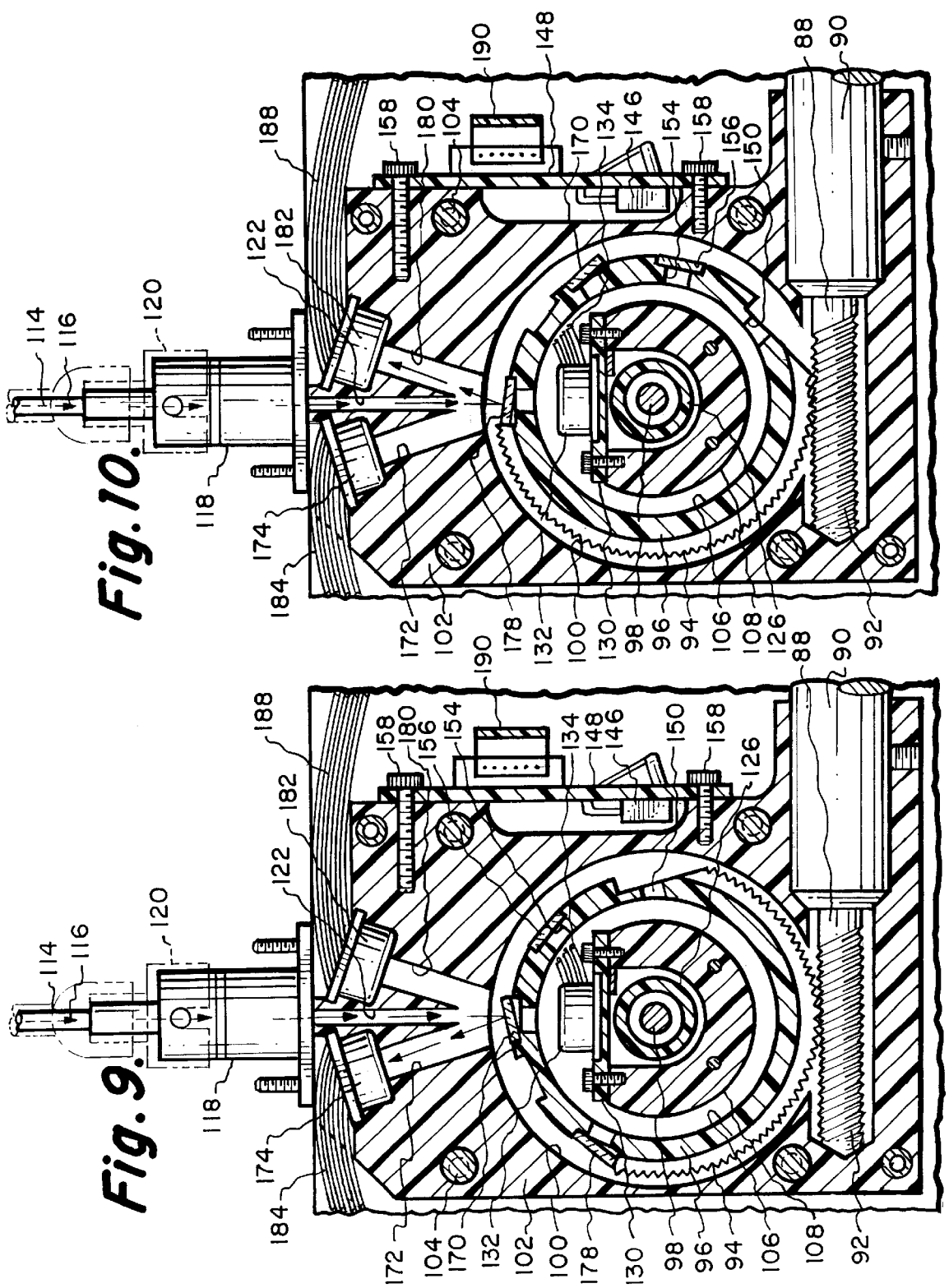

ELECTRONIC FIBEROPTIC POWER AND WAVELENGTH MEASURING INSTRUMENT

BACKGROUND OF THE INVENTION

1) Field of the Invention

This invention relates to an instrument that is used to measure power and wavelength of a light beam within a fiberoptic cable.

2) Description of the Prior Art

Fiberoptics includes one or more optical fibers constructed of glass or plastic which are clad with material of lower refractive index. These optical fibers can be arranged in the form of a wire. The light loss, or attenuation, in optical fibers can be very low. The most common use at the present time of fiberoptics is in the field of communications. Light transmitted along an optical fiber is equivalent to an electrical signal being conducted along a wire. However, an optical fiber has a number of advantages over an electrical conducting wire. These advantages include a greater information carrying capacity as a single fiber can carry thousands of telephone conversations and also complete freedom from electrical interference.

When dealing with fiberoptic communications equipment, there is required maintenance and repair of fiberoptic cables. Fiberoptic technicians need certain maintenance and repair equipment with a common form of such equipment being an optical power meter. The power of the light within optical cables can vary between a −80 dBm (decibels) to a +30 dBm and beyond. Zero dBm equals 1 milliwatt (mw) of power.

In the past, an optical power meter could only measure the power within a certain power range and for a limited wavelength range. Therefore there is required two to three different optical power meters to effectively measure the power from −80 dBm to +30 dBm at all common wavelengths. It is also normally desirable to measure the wavelength of a light beam. Although wavelengths are capable of varying between 630 nm (nanometers) to 1700 nm, communication companies use selected wavelengths (650 nm, 850 nm, 1310 nm and 1550 nm) and with the advent of DWDM (Dense Wavelength Division Multiplexing) the wavelength band of between 1520 dBm and 1580 dBm.

It would be desirable to design a single optical power meter that could be utilized to measure both high power and low power of light levels within optical fibers and also could be utilized to measure the wavelength of the light within the commonly used band by communication companies.

SUMMARY OF THE INVENTION

An electronic fiberoptic power and wavelength measuring instrument comprising a housing which has an exterior surface upon which is mounted an optical port. This optical port is to be connected to a source of transmitted light with this light being collimated within the housing. The light is being transmitted directly to a primary detector. Mounted within the housing in close proximity to the primary detector and spaced therefrom is at least one secondary detector and possibly two secondary detectors. The beam of light is to be intersected by a movable member with the preferable form of the movable member being a pivotable wheel. The wheel can be pivoted and fixed in different locations with one location providing for direct transmission of the light beam to the primary detector and a second location being for reflection of a portion of the light beam to a secondary deflector. The movable member can also be moved so the light beam can be reflected to a further secondary reflector. Mounted on the wheel are different light filters that provide for the transmission and/or reflection of the light beam between the different detectors.

The primary objective of the present invention is to construct an electronic fiberoptic power and wavelength measuring instrument that eliminates the need for utilizing of different optical power measuring instruments and also eliminates the need for a separate wavelength measuring instrument.

Another objective of the present invention is to construct an electronic fiberoptic and power wavelength measuring instrument which is small in size and therefor is deemed to be readily portable and can be carried by a technician to be used at a job site.

BRIEF DESCRIPTION OF THE DRAWINGS

FIG. 1 is an exterior frontal view of the instrument of the present invention showing the display panel of the instrument and the keyboard;

FIG. 2 is a right side view of the instrument of FIG. 1;

FIG. 3 is back view of the instrument of FIG. 1;

FIG. 5 is a cross-sectional view through a portion of the instrument taken along line 5—5 of FIG. 2 showing in more detail the movable member that is positioned to intersect the light beam that is to be beamed within the instrument with the position of the movable member permitting direct transmission of the light beam to the primary detector;

FIG. 6 is a cross-sectional view taken along line 6—6 of FIG. 5;

FIG. 9 is a cross-sectional view similar to that of FIG. 8 but showing the movable member in a still further different position;

FIG. 10 is a cross-sectional view similar to that of FIG. 9 but showing the movable member in a still further different position.

DETAILED DESCRIPTION OF THE PREFERRED EMBODIMENT

Figure 4:
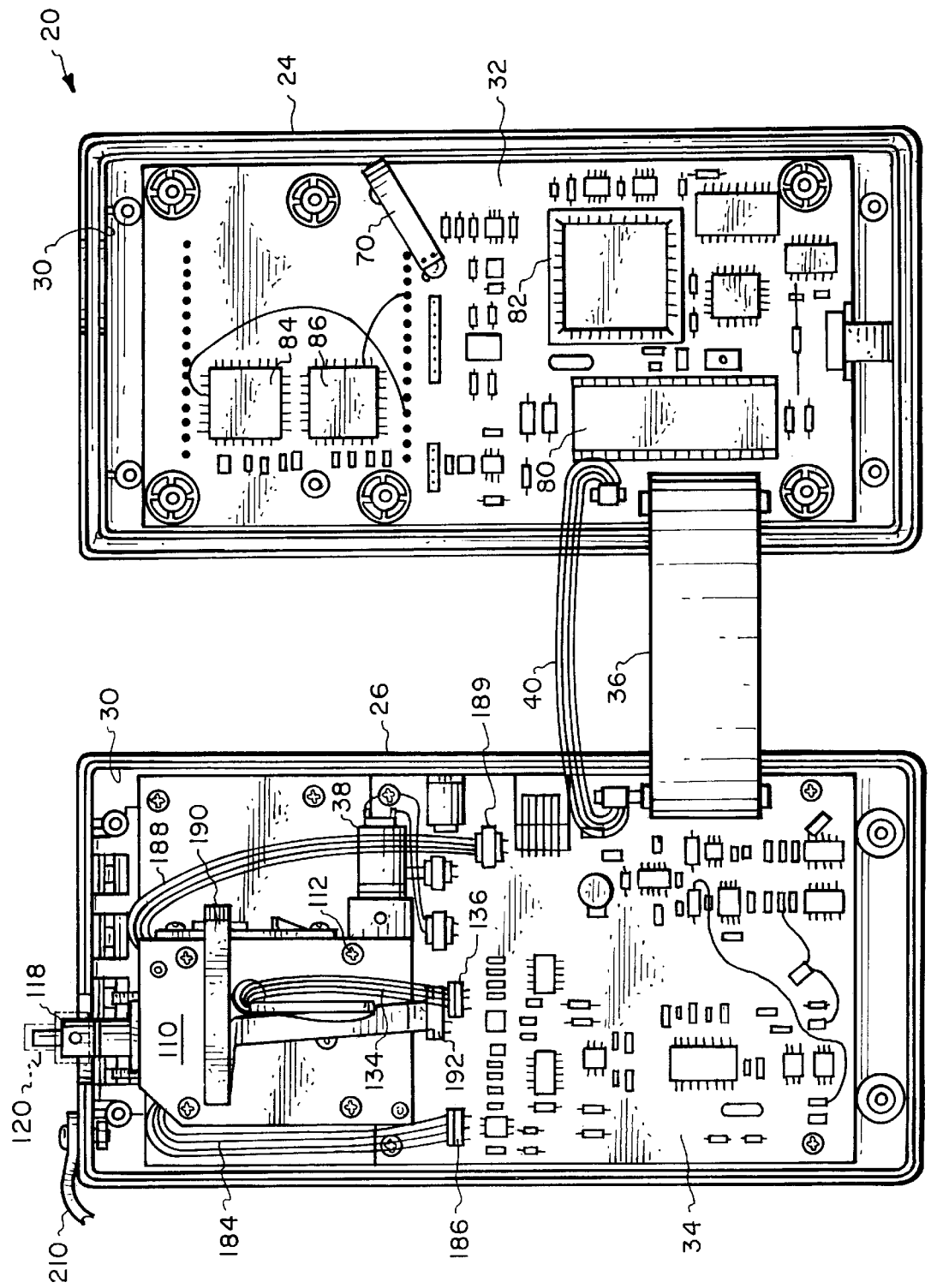
FIG. 4 is a view showing the housing of the instrument being located in an open position with the housing being divided into a front half and a back half.
Figure 7:
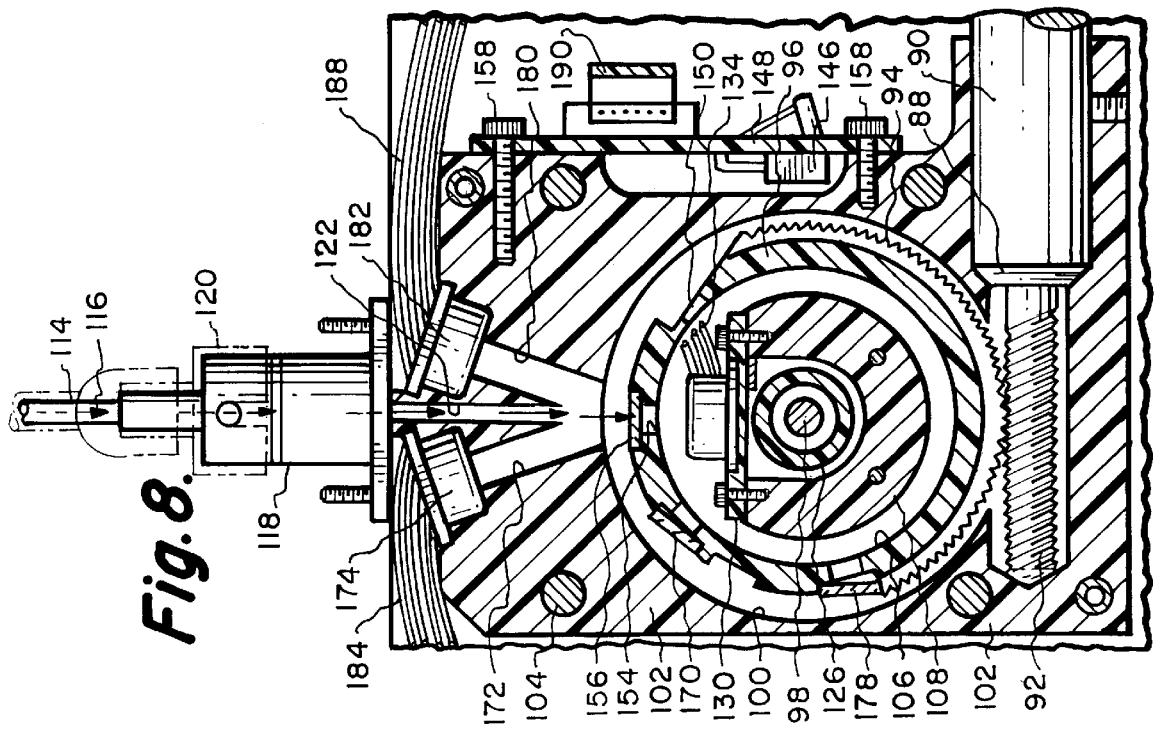
FIG. 7 is a cross-sectional view similar to FIG. 5 taken along line 7—7 of FIG. 2.
Figure 8:
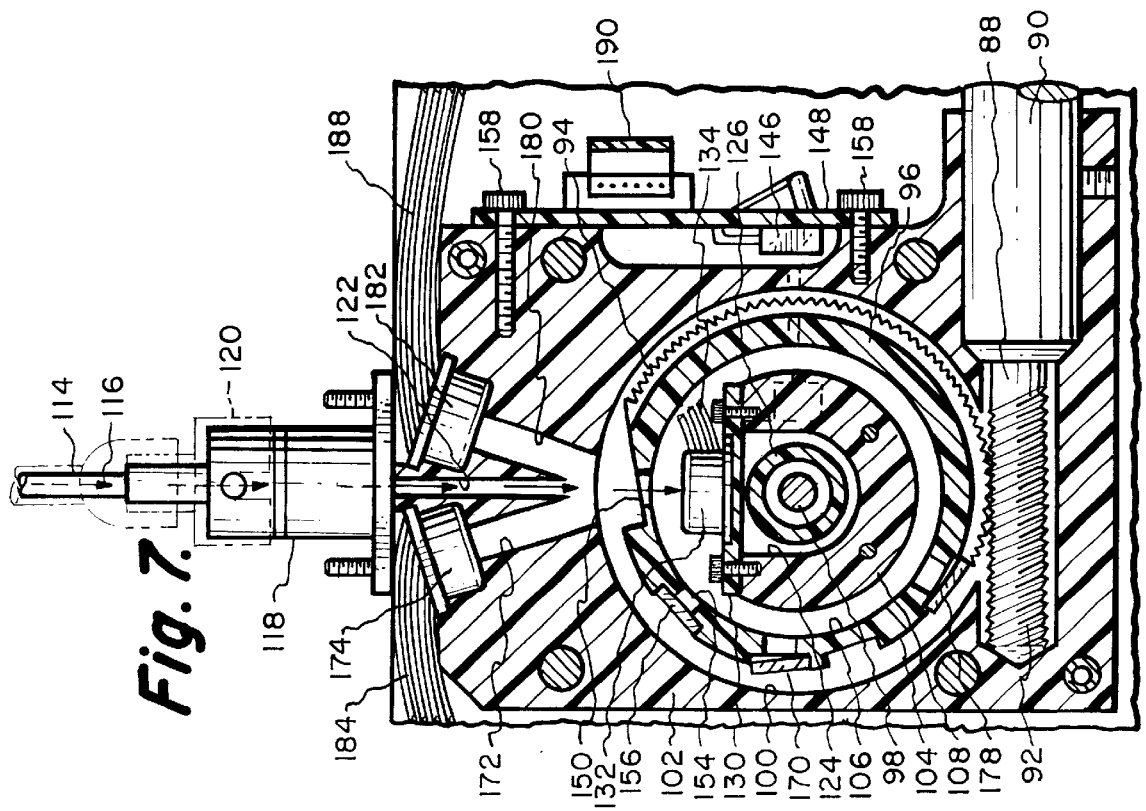
FIG. 8 is a cross-sectional view similar to that of FIG. 7 but showing the movable member in a different position.

Referring particularly to the drawings, there is shown in FIGS. 1–4 the electronic fiberoptic power measuring instrument 20 of this invention. The instrument 20 has a plastic housing 22 which is formed of a front half 24 and a rear half 26. When the front half 24 is fixedly mounted to the rear half 26 by means of screw fasteners 28 there is formed an enclosed internal chamber 30. Mounted within the internal chamber 30 of the front half 24 is an electronic circuit board 32. A similar circuit board 34 is mounted within the rear half 26. A signal cable interconnects the circuit boards 32 and 34. Also connected from the circuit boards 32 and 34 is a power cable 40. Mounted on each of the circuit boards 32 and 34 are a mass of electrical and electronic components that are necessary for the operation of the instrument 20 of this invention. Power to the instrument 20 is supplied by a series of batteries that are mounted within the battery compartment which is covered by a battery compartment cover 42. The batteries may be recharged by a recharger (not shown) that connects with recharging connector 74.

Electronic readings of the instrument 22 are to be displayed within a display screen 44 formed within the front half 24. The front half 24 also includes a keyboard 46 which includes an on/off button 48. Indicator light 50 informs the user that the instrument 20 is "on". The keyboard 46 also includes a button 52 to cause the numerical power indicia to be displayed in mw (milliwatts) on the display screen 44. Button 54, if pushed, would cause the numerical indicia within the display screen 44 to be displayed in dBm (decibels). Activation of the button 56 for a period of one second will result in a relative difference to be displayed from an immediately previous numerical value. Button 58, when activated, will result in the wavelength being displayed within the display screen. The power level will vary according to wavelength of the light being measured. Therefore, before making any power measurement, the user should press button 60 which will immediately display a selection of calibration wavelengths to be selected from. This instrument will be preprogrammed and calibrated with normal wavelengths of 850 nm, 980 nm, 1300 nm, 1310 nm, 1550 nm and 1625 nm. The last used wavelength will be initially displayed at power up (for example 850 nm). If this is the approximate wavelength of the light, then the user should then proceed to make the power measurement. However, if the approximate wavelength value is other than the selected one, then the button 60 is to be pressed again which will display the wavelength value of 980 nm. Repeated pressing of button 60 will result in the further preprogrammed and calibrated values being displayed. When the correct approximate wavelength value is displayed, the power measurement is then to be taken.

In order to store any displayed value, it is only necessary to push the store button 62. To recall that numerical value at a later time, it is only necessary to push the recall button 64. The up and down buttons 66 and 68, respectively, are to be pushed in order to scroll through different numerical values prior to recalling of a desired value. Pushing of button 70 will turn on and off the backlight for the display screen 44. The backlight of the display screen 44 works through backlight lead 70 mounted on the circuit board 32. Instrument 20 of this invention could be connected to a separate printer, which is not shown, by utilizing of connector 72. Printing of the displayed material on the display screen 44 is to be accomplished by pushing of the print button 76. Pushing of the button 78 will cause the instrument to display on the display screen 74 the different options that are available using of the instrument 20 such as automatic shut-off and to what decimal place the numerical values are to be displayed.

Mounted on the circuit board 34 is an electrical motor 38. Mounted on the circuit board 32 are a pair of microcontrollers 80 and 82. Also mounted on the circuit board 32 are display controllers 84 and 86. The display controllers 84 and 86 work in conjunction with the display screen 44.

Motor 38 causes rotation of a shaft 88 which is mounted within a motor shaft mount 90. The motor shaft 88 is formed into a worm gear 92. The worm gear 92 is to be in continuous contact with a ring gear segment 94. The ring gear segment 94 is mounted on a wheel 96. The wheel 96 is pivotally mounted on a pin 98 which is fixedly mounted on the rear half 26 of the housing 22. The wheel 96 is mounted within chamber 100 which is formed within a block 102 which is fixedly mounted by rivets 104 to the rear half 26 of the housing 22. The wheel 96 includes a hollow center 106. Located within the hollow center 106 is a U-shaped block 108. The U-shaped block 108 is to be mounted on the inside surface of a cover plate 110. The cover plate 110 is designed to be fixedly secured by screw fasteners 112 to the block 102 completely enclosing of chamber 100. However, light in the form of a light beam that is contained within optical fiber cable 114 is to be transmitted in the direction of arrow 116 into optical port connector 118. The optical port connector 118 is fixedly mounted by appropriate screw fasteners, which are not shown, to the block 102. The optical port connector 118 extends exteriorly of the plastic housing 22.

Typically, the one end of the optical cable 114 is connected to the adapter 120. This adapter 120 connects to the optical port 118. It is desirable to have this light beam be narrowed within the instrument 20 and included within the optical port connector 118 is a collimator, which is not shown, which collimates the light into a parallel beam of approximately 1 mm in diameter. This 1 mm in diameter light beam is transmitted through passage 122 formed within the block 102. The passage 122 connects with the chamber 100.

The U-shaped block 108 includes a hollowed-out section 124. The pin 98 is mounted within plastic tube 126 which is formed as part of the wheel 96. A washer assembly 128 mounts the upper end of the pin 98 to the tube 126. The wheel 96 is restrained against movement toward and away from the block 102 but is permitted to move relative to the block 102. A plate 130 is mounted on the U-shaped block 108. Mounted on the plate 130 is a photo detector defined as the primary detector 132. Photo detectors are well known in the field of fiberoptics and need not to be described here in any particular detail and are relatively purchasable on the open market. The primary detector 132 connects through a cable assembly 134 to a plug 136 with this plug 136 being mounted to the printed circuit board 34. Normally, the primary detector 132 will be constructed of Indium Gallium Arsenide (InGaAs). This primary detector 132 is to be sensitive to light within the wavelength range of 850 nm to 1700 nm.

Mounted on U-shaped block 108 are a pair of small light sources 138 and 140 usually light emitting diodes (LEDs). Separating the light sources 138 and 140 is a separating wall 142. The light sources 138 and 140 are aligned in a direction parallel to the longitudinal center axis of the pin 98. The light sources 138 and 140 are to be electrically activated with both the light sources 138 and 140 being on all the time the instrument 20 is on. When the instrument 20 is initially activated, the worm gear 92 is turned so that the wheel 96 will be pivoted to an "at home" position which is detected by the light from light source 140 passing through hole 144 formed within the wheel 96 and this light being detected by light detector 146 which is mounted on plate 148. The plate 148 is fixedly mounted by bolts 158 to the block 102. The light from the light source 140 after passing through the hole 144 passes through a hole 160 formed within the block 102 prior to being beamed onto light detector 146. Upon the light detector 146 sensing light through the hole 144, the worm gear 92 is deactivated and the "at home" position of the wheel 96 is established. When in the "at home" position, the beam of light from cable 114 is conducted through passage 122 and through hole 150 of the wheel 96 and in contact with the primary detector 132. The power of that light beam if it is between −80 dBm to +5 dBm will be detected and displayed digitally on the display screen 44 as long as the user has pressed button 54. If the user wishes to display the power in watts, the button 52 is to be pressed.

If the user determines that the wavelength of the light beam passing through passage 122 is not within the power range of −80 dBm to +5 dBm, the user can then press button 58 once which will cause the motor 38 to be activated turning of worm gear 92 and pivoting of the wheel 96 a prescribed number of degrees until hole 152 aligns between the light source 140 and the light detector 146 at which time the motor 38 will be deactivated and the wheel 96 will then be stopped which will position hole 154 in position to intersect the light beam passing through the passage 122. The hole 154 is covered by a filter 156. For the purpose of this invention, a filter is defined as a small glass chip that can either transmit light, reflect light or accomplish varying degrees of both. In this particular instance, the filter 156 will transmit light at a decreased power level which is precisely 25 dB less. The primary detector 132 is only accurate up to about +5 dBm. However, since the filter 156 decreases the intensity of the light by 25 dB, that means that the primary detector 132 is now accurate up to +30 dBm. Therefore, with the light beam passing through the filter 156, the primary detector 132 can be used to accurately detect power up to +30 dBm and the software within the electronic circuitry of the instrument 20 of this invention will automatically register that the light beam is passing through the filter 156 and change the digital readings being displayed on the display screen 44 accordingly.

Simultaneously to when the light source 140 is beamed to the light detector 146, light source 138 beams light through a hole 162 formed within the wheel 96 and hole 164 formed within the block 102 to then be picked up by light detector 166. The light detector 166, as well as light detector 146, are mounted on the plate 148. When the wheel 96 is moved from the "at home" position, the wheel 96 continues to move until the hole 152, which has been previously mentioned, aligns with the light source 138 and is picked up by light detector 166 at which time the wheel 96 is then stopped.

Upon the user then hitting button 58 a second time, the wheel 96 is then caused to pivot again by activation of the motor 38. The movement of the wheel 96 is to continue until hole 168 aligns with the light source 138 and is picked up by light detector 166 which then shuts down the motor 38. At this particular position, the light beam passing through the passage 122 comes into contact with filter 170. The filter 170 is to both transmit light and reflect light. The reflected light is to be transmitted through passage 172 to secondary detector 174. The secondary detector 174 will normally be of the same type of detector as the primary detector 132. It is to be noted that at a certain minimum wavelength (1530 nm), eighty percent of the light will be reflected with twenty percent of the light being transmitted. At a maximum value wavelength (1580 nm), it is also known that about eighty percent will be transmitted and twenty percent will be reflected. The software contained within the instrument 20 will ascertain what percentage of the wavelength is being transmitted to the primary detector 132 and what percentage is being reflected to the secondary detector 174. These percentage values of transmitted light and reflected light will be compared to preprogrammed values within the software and from that determine the actual wavelength of the light beam that is being transmitted through the passage 122. This wavelength value is displayed on the display screen 44 when button 60 is pressed. The instrument 20 of this invention can only be used at this time to calculate light wavelength within the range of 1520 nm to 1580 nm. However, this range of wavelength is in exceedingly common usage in communication so this wavelength calculation is a significant feature.

Upon the wavelength button 60 being again pressed along with button 64, the wheel 96 will then begin pivoting clockwise until hole 176 aligns with the light source 138 and light is detected by light detector 166. At that time, the motor 38 is again to be shut down and the filter 178 will be aligned with the passage 122. The filter 178 comprises one hundred percent mirror with all the light being reflected through passage 180 to silicon detector 182. The detector 182 is capable of measuring the power of the wavelength of light from 450 nm to 1000 nm.

The detector 174 is connected by cable assembly 184 to the printed circuit board 34 by means of plug 186. The detector 182 is connected by a cable assembly 188 which is also to be connected to the circuit board 34 by means of plug 189, in FIG. 4 of the drawings. The light detectors 146 and 166 transmit signals through cable assembly 190 to plug 192 to the circuit board 34.

During the time that the instrument 20 of this invention is not being operated, protective cap 194 is to be placed about the optical port connector 118 covering such to protect the optical port connector 118 from contamination. The protective cap 194 is permanently attached by a strap 210 to the rear half 26 of the housing 22. The rear half 26 of the housing 22 includes a pivotally movable stand brace 196 which is basically of a U-shaped configuration and is intended to be pulled outward by the user so that the instrument 20 can be placed in a semi-upright position when in use.

Figure 11:
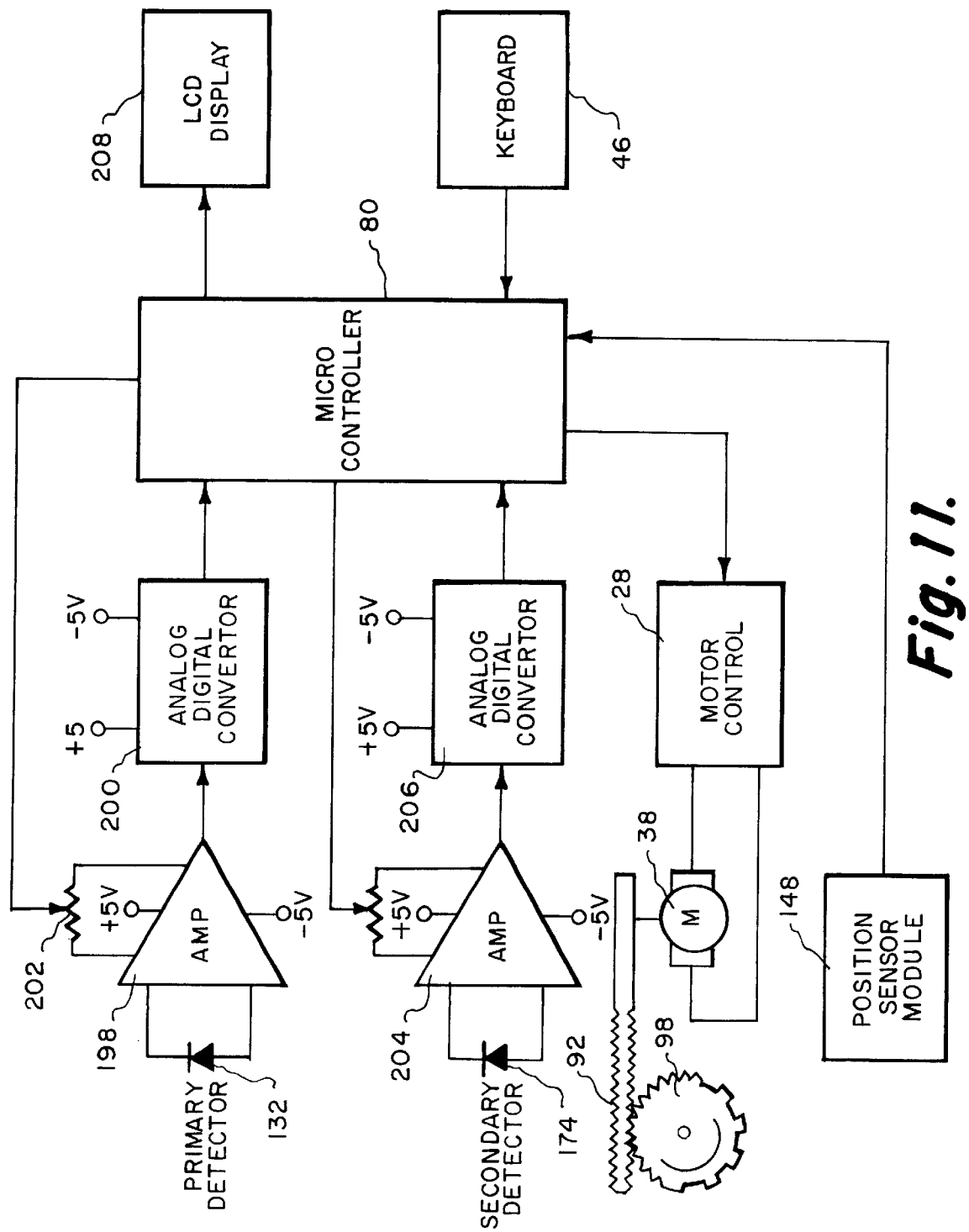
FIG. 11 is a block diagram of the electronic circuitry that is utilized in conjunction with the instrument of the present invention.

Referring particularly to FIG. 11 of the drawings, the primary detector 132 is electrically connected through an amplifier 198 to an analog digital convertor 200. The amplifier 198 is to operatively driven by the microcontroller 80 within a preset range by means of a potentiometer 202. Both the amplifier 198 and the convertor 200 are to be supplied a source of electrical power of +5V. Also, the convertor 200 is to receive a −5V of power.

The secondary detector 174 similarly operates through an amplifier 204 and a analog digital convertor 206 to the microcontroller 80. Again, the amplifier 203 and the convertor 206 are to receive a +5V of electrical power with the convertor 205 also receiving a −5V of power.

The motor 38 is to be operatively driven by a motor control 208 which is mounted on the circuit board 34 and is connected to the microcontroller 80. The position sensor module which includes plate 148 is also connected to the microcontroller 80. It is the job of the position sensor module to determine the position of the wheel 96. The keyboard 46 supplies input into the microcontroller 80. The microcontroller 80 supplies an output to an LCD display 208 which digitally displays the values on the display screen 44.

What is claimed is:

1. An electronic fiberoptic power and wavelength measuring instrument comprising:

a housing having an exterior surface which encloses an internal chamber;

electronic circuitry mounted within said internal chamber;

an optical port for receiving a light beam, said optical port being mounted on said exterior surface of said housing;

a primary detector mounted within said internal chamber, said primary detector for directly receiving light from said optical port;

a secondary detector mounted within said internal chamber and spaced from said primary detector, said secondary detector for receiving reflected light from said optical port;

a wheel mounted within said internal chamber, said wheel surrounding said primary detector, said wheel including a driven gear, said driven gear connecting with the drive gear, said drive gear connecting with the motor shaft, said wheel being pivotable between different positions and fixable in each position of said different positions; and a light filter mounted on said wheel, said light filter to intersect the light beam with said wheel located in a said position, said light filter to transmit a portion of the light beam to said primary detector and reflect the remaining portion of the light to said secondary detector, whereby the wavelength of light can be determined by comparing the amount of reflected light versus the amount of transmitted light and the power of the light can be calculated by determining the power of the reflected light and the transmitted light and adding such together.

2. The electronic fiberoptic power and wavelength measuring instrument as defined in claim 1 wherein:

there being a second light filter to reflect light to an additional secondary detector.

3. An electronic fiberoptic power measuring instrument comprising:

a housing having an exterior surface which encloses an internal chamber, electronic circuitry being mounted within said internal chamber;

an optical port for receiving a light beam, said optical port being mounted on said exterior surface of said housing;

detector means mounted within said internal chamber, said detector means for receiving light from said optical port;

means for selectively altering the light beam in order to obtain a wide range of power measurements, said means being mounted within said internal chamber, said means being movable to be located in anyone of a plurality of different positions and being fixable in each said position with a specific power reading range being obtained at each said position;

said means for selectively altering the light beam comprising a pivotable member, said pivotable member having at least one light filter, said light filter being positionable to intersect the light beam; and said pivotable member comprising a wheel.

4. The electronic fiberoptic power measuring instrument as defined in claim 3 wherein:

said wheel including a driven gear, said driven gear being connectable with a drive gear, said drive gear being connected to a motor.

5. The electronic fiberoptic power measuring instrument as defined in claim 3 wherein:

said detector means comprising a plurality of spaced apart detectors.

6. An electronic fiberoptic power measuring instrument comprising:

a housing having an exterior surface which encloses an internal chamber, electronic circuitry being mounted within said internal chamber;

an optical port for receiving a light beam, said optical port being mounted on said exterior surface of said housing;

detector means mounted within said internal chamber, said detector means for receiving light from said optical port;

means for selectively altering the light beam in order to obtain a wide range of power measurements, said means being mounted within said internal chamber, said means being movable to be located in anyone of a plurality of different positions and being fixable in each said position with a specific power reading range being obtained at each said position;

said pivotable member comprising a wheel;

said detector means comprising a plurality of spaced apart detectors; and said detectors comprising a primary detector and a secondary detector, said primary detector mounted within said wheel, said secondary detector being mounted exteriorly of said wheel.

7. The electronic fiberoptic power measuring instrument as defined in claim 6 wherein:

said wheel having a home position where the light beam is transmitted directly to said primary detector, said home position being initially established upon activation of said instrument.

8. An electronic fiberoptic power measuring instrument comprising:

a housing having an exterior surface which encloses an internal chamber, electronic circuitry being mounted within said internal chamber;

an optical port for receiving a light beam, said optical port being mounted on said exterior surface of said housing;

detector means mounted within said internal chamber, said detector means for receiving light from said optical port;

means for selectively altering the light beam in order to obtain a wide range of power measurements, said means being mounted within said internal chamber, said means being movable to be located in anyone of a plurality of different positions and being fixable in each said position with a specific power reading range being obtained at each said position;

said pivotable member comprising a wheel; and said wheel including at least one light filter, said light filter functioning to both transmit light and also to reflect light in a direction angularly disposed relative to the direction of the light beam.

* * * * *